(12) United States Patent
Dold et al.

(10) Patent No.: US 8,125,629 B2
(45) Date of Patent: Feb. 28, 2012

(54) TRACKING METHOD AND MEASURING SYSTEM COMPRISING A LASER TRACKER

(75) Inventors: Jürgen Dold, Sempach (CH); Daniel Moser, Seengen (CH); Roland Zumbrunn, Wittinsburg (CH)

(73) Assignee: Leica Geosystems AG, Heerbrugg (CH)

( * ) Notice: Subject to any disclaimer, the term of this patent is extended or adjusted under 35 U.S.C. 154(b) by 746 days.

(21) Appl. No.: 12/160,695

(22) PCT Filed: Jan. 4, 2007

(86) PCT No.: PCT/CH2007/000006
§ 371 (c)(1),
(2), (4) Date: Sep. 4, 2008

(87) PCT Pub. No.: WO2007/079601
PCT Pub. Date: Jul. 19, 2007

(65) Prior Publication Data
US 2011/0181872 A1    Jul. 28, 2011

(30) Foreign Application Priority Data
Jan. 13, 2006   (CH) .......................................... 58/06

(51) Int. Cl.
*G01B 11/26* (2006.01)
(52) U.S. Cl. .............................. 356/139.04; 356/139.01
(58) Field of Classification Search ........ 356/3.01–28.5, 356/139.01, 139.1
See application file for complete search history.

(56) References Cited

U.S. PATENT DOCUMENTS

| 5,098,185 | A | 3/1992 | Watanabe et al. |
| 7,180,607 | B2 | 2/2007 | Kyle et al. |
| 2002/0060784 | A1* | 5/2002 | Pack et al. .......................... 356/6 |
| 2003/0169414 | A1* | 9/2003 | Benz et al. ...................... 356/5.1 |
| 2004/0232317 | A1* | 11/2004 | Ura et al. ...................... 250/221 |
| 2006/0140450 | A1* | 6/2006 | Hong et al. .................... 382/107 |

FOREIGN PATENT DOCUMENTS

| DE | 2239999 | 3/1973 |
| EP | 1480006 A2 | 11/2004 |
| JP | 4283614 | 10/1992 |
| JP | 8166240 | 6/1996 |
| JP | 2004-170412 | 6/2004 |

* cited by examiner

*Primary Examiner* — Thomas Tarcza
*Assistant Examiner* — Luke Ratcliffe
(74) *Attorney, Agent, or Firm* — Rankin, Hill & Clark LLP

(57) ABSTRACT

A measuring system includes a laser tracker (10), a target point marked by a reflector (12), a surveying apparatus (13), and an arithmetic and control unit (14). The laser tracker emits a measuring beam (M) which is reflected by the reflector, a process that is used for determining the distance between the laser tracker (10) and the reflector (12). The surveying apparatus has a known position and orientation relative to the measuring beam (M) while preferably being embodied as a survey camera. The inventive measuring system is designed so as to track the reflector (12) via the measuring beam (M). In a normal tracking mode (A), a measured value for controlling the orientation of the measuring beam (M) is derived from the detection of the measuring beam reflected by the reflector (12). If the measuring beam is not directed onto the reflector, the system switches to a special tracking mode in which the measured value for controlling the orientation of the measuring beam (M) is derived from an image (20) of the survey camera (13).

10 Claims, 2 Drawing Sheets

TRACKING METHOD AND MEASURING SYSTEM COMPRISING A LASER TRACKER

BACKGROUND OF THE INVENTION

The invention lies in the field of measurement technology and relates to a tracking method and to a measurement system with a laser tracker, according to the preambles of the respective patent claims. The tracking method serves for the automatic tracking of a target point, in particular a moving target point, with the aid of the measurement beam of a laser tracker. The measurement system with a laser tracker is designed for carrying out the method.

So-called laser trackers are widely used for the measurement of the position of moving target points. A laser tracker is understood to be a device comprising at least one distance meter functioning with a focused laser beam (called measurement beam in the subsequent description). In such a laser tracker, for example, the direction of the measurement beam towards the target point is set with the help of a mirror rotatable about two axes, and is detected by an angle transmitter assigned to each one of the rotation axes. The target point to be measured is provided with a retro-reflector (in particular cube-corner prism or arrangement of three mirrors which are perpendicular to one another), wherein the retro-reflector reflects the incident measurement beam of the laser tracker, back to the tracker. Therein, the reflected measurement beam runs coaxially to the emitted measurement beam if the measured beam is incident on the reflector in an exactly centric manner, and parallel to the emitted beam if the latter impinges the reflector non-centrically. Depending on the type of the tracker, an absolute distance between the laser tracker and the target point and/or a change of this distance is deduced from a comparison of the emitted and reflected laser light. The position of the reflector or the target point relative to the tracker is computed from the angles detected by the angle transmitters, and the distance detected by the distance meter.

A part of the reflected measurement beam is usually guided onto a PSD (position sensitive device). The parallel displacement of the reflected measurement beam relative to the emitted measurement beam is deduced from the position in which the reflected measurement beam is incident on the light-sensitive surface of the PSD. Corresponding measurement data define the parallel offset of the reflected measurement beam, and are used for controlling the measurement beam direction, in a manner such that the measurement beam follows the target point (tracking) when it moves. For achieving this, the parallel offset between the emitted and the reflected measurement beam is reduced in size or kept as small as possible, by changing the measurement beam direction or the alignment of the mirror which directs the measurement beam respectively.

It is evident that control of the measurement beam direction by way of the parallel offset between the emitted and the reflected measurement beams, includes a small, but not negligible delay, which limits the speed with which a target point may move and still be tracked. If the target point moves more quickly, the measurement beam moves off the reflector before its direction can be corrected accordingly, such interrupting the tracking process as well as the position measurement. The same may happen if an obstacle gets between the tracker and the target point, so that the measurement beam is interrupted. If the laser tracker or the measurement beam of the laser tracker respectively "loses" the reflector, the operating person is made aware of this and, given a suitable design of the tracker, may initiate a search routine.

As soon as the target point has been "found" again, which means that the measurement beam is again incident on the reflector and is reflected by the latter, measurement of the position of the target point and tracking thereof with the aid of the measurement beam can be taken up again, which however, may necessitate re-initiation of the distance measurement. The mentioned tracking interruptions get more frequent, if movements of the target point get less controlled, and if the diameters of reflector and measurement beam get smaller. At the beginning of a measurement process when the tracker is not yet aimed at the target point, the same conditions prevail as during the mentioned tracking interruptions.

In systems with automatically moved target points, the described tracking interruptions can be prevented simply by adapting the movements of the target point precisely to the tracking capabilities of the laser tracker. This, however, is significantly more difficult in measurement systems, in which the target point is moved by hand, i.e. where the target point or the object on which the target point is arranged, is moved by a person. In such systems, tracking interruptions cannot be avoided completely and may even occur relatively frequently. This is particularly the case for measurement systems in which the object carrying the reflector for example is a hand-held touch tool or a hand-held scanner, wherein the touch tool or scanner is guided over an object to be measured by a measuring person, and the position and orientation of the touch tool or scanner is tracked by a laser tracker, and is registered in an essentially continuous manner. In particular for such systems, it would be desirable to be able to bridge tracking interruptions rapidly and in an automatic manner, that is to say in particular without necessitating any intervention by the operator.

It is also known to provide laser trackers with an overview camera having an as large as possible viewing angle (for example ±20° in all directions), the overview camera being aligned with the tracker in a manner such that the measurement beam can be directed to a target point recognised on the camera image. Aiming of the measurement beam towards the target point is initiated by an operating person observing the camera image and suitably indicating the image region in which the target point is imaged.

BRIEF SUMMARY OF THE INVENTION

It is the object of the invention to provide a tracking method and a measurement system equipped for the tracking method, with which it becomes possible to bridge tracking interruptions as shortly described above, in an automatic and simple manner.

This object is achieved by the tracking method and the measurement system with laser tracker, as are defined in the patent claims.

The tracking method according to the invention comprises two tracking modes and switches the measurement system from one of the tracking modes into the other one, when the measurement beam of the laser tracker has "lost" the target point and when the laser tracker has "re-found" the target point. The normal or ordinary tracking mode is the known tracking of the laser tracker, i.e. tracking based on the measurement beam, in which, for example, the parallel offset between emitted and reflected measurement beam is detected and reduced by a corresponding change of the measurement beam direction. In the ordinary tracking mode, the tracker detects the measurement beam reflected by the reflector, and an evaluation of the target point position is possible at all times. In the extraordinary tracking mode, in which the measuring system according to the invention functions when the tracker is not able to detect the reflected measurement beam, the change of the measurement beam direction is controlled by way of data, which are recorded by an overview apparatus assigned to the laser tracker. The overview apparatus is advantageously a digital overview camera providing image data with the aid of a light-sensitive surface (e.g. CCD) and optics which give to the overview camera a viewing angle of for example ±20° in all viewing directions, as is common for an overview apparatus. The overview apparatus may however also comprise a PDS (position sensitive device) which is provided with the same or similar optics and which only provides position data. A direction to the reflector is determined from the data registered by the overview apparatus, and, by way of a corresponding change of the measurement beam direction, the measurement beam is directed as well as possible towards the reflector. The extraordinary tracking mode thus operates without the detection of the reflected measurement beam, and an evaluation of the position of the target point with the help of the tracker is not possible in the extraordinary tracking mode. The extraordinary tracking mode is activated as soon as no reflected measurement beam is detected by the laser tracker. In the extraordinary tracking mode however, the system keeps checking as to whether a reflected measurement beam is detected by the tracker or not. As soon as such detection is registered, the system switches back into the ordinary tracking mode and the position measurement is released to operate.

The measurement system according to the invention operates in the extraordinary tracking mode as long as the target point is in the viewing field of the overview apparatus or as long as the latter is able to provide data with regard to the target point, respectively, and as long as no reflected measurement beam is detected by the laser tracker. When the target point moves out of the viewing field of the overview apparatus, then for example, the operating person is made aware of this and/or a search routine is automatically activated.

In the measuring system according to the invention, an overview apparatus is assigned to the laser tracker, the overview apparatus having a position and orientation relative to the measurement beam of the laser tracker which position and orientation is known at all times, such that, from the measurement data provided by the overview apparatus and from this known position and orientation of the overview apparatus, it is possible to compute a change in the measurement beam direction being necessary for better directing the measurement beam towards the target point. The overview apparatus has an as large as possible viewing angle and may be arranged on the laser tracker in a stationary manner or alignable with the measurement beam.

Moreover, the measurement system according to the invention is equipped for generating control data for the control of the measurement beam direction, from the known position and orientation of the overview apparatus and from data provided by the overview apparatus, and for switching over from one tracking mode to the other one, depending on whether a reflected measurement beam is detected by the laser tracker or not. As the case may be, the overview apparatus is equipped for an illumination of its viewing field and/or the target point is equipped with additional light-giving means (active light sources or reflecting surfaces), so that the position of the target point and possibly its identity can be detected by the overview apparatus.

Methods known per se are applied for determining the direction to the target point from data recorded by the overview apparatus. If the overview apparatus is a camera, the target point may also be identified by way of a specific shape or color on the image recorded by the camera. This makes it possible to recognise and automatically select the target point from a plurality of elements simultaneously imaged by the camera, in a per se known manner. For cases in which the target point cannot be identified in an unambiguous manner and a plurality of similar elements appear on the image recorded by the camera, it is possible to get, for example, the imaged element which lies closest to the measurement beam tracked, or to prompt an operating person to select one of the potential target points. Target point recognition is likewise possible with an overview apparatus comprising a PSD, if the light coming from the target point has a specific wavelength and the overview apparatus is equipped with corresponding filters.

BRIEF DESCRIPTION OF THE DRAWINGS

The tracking method and the measurement system with laser tracker according to the invention are described in more detail by way of exemplary embodiments which are illustrated in the following Figs., wherein.

DETAILED DESCRIPTION OF THE INVENTION

Figure 1:
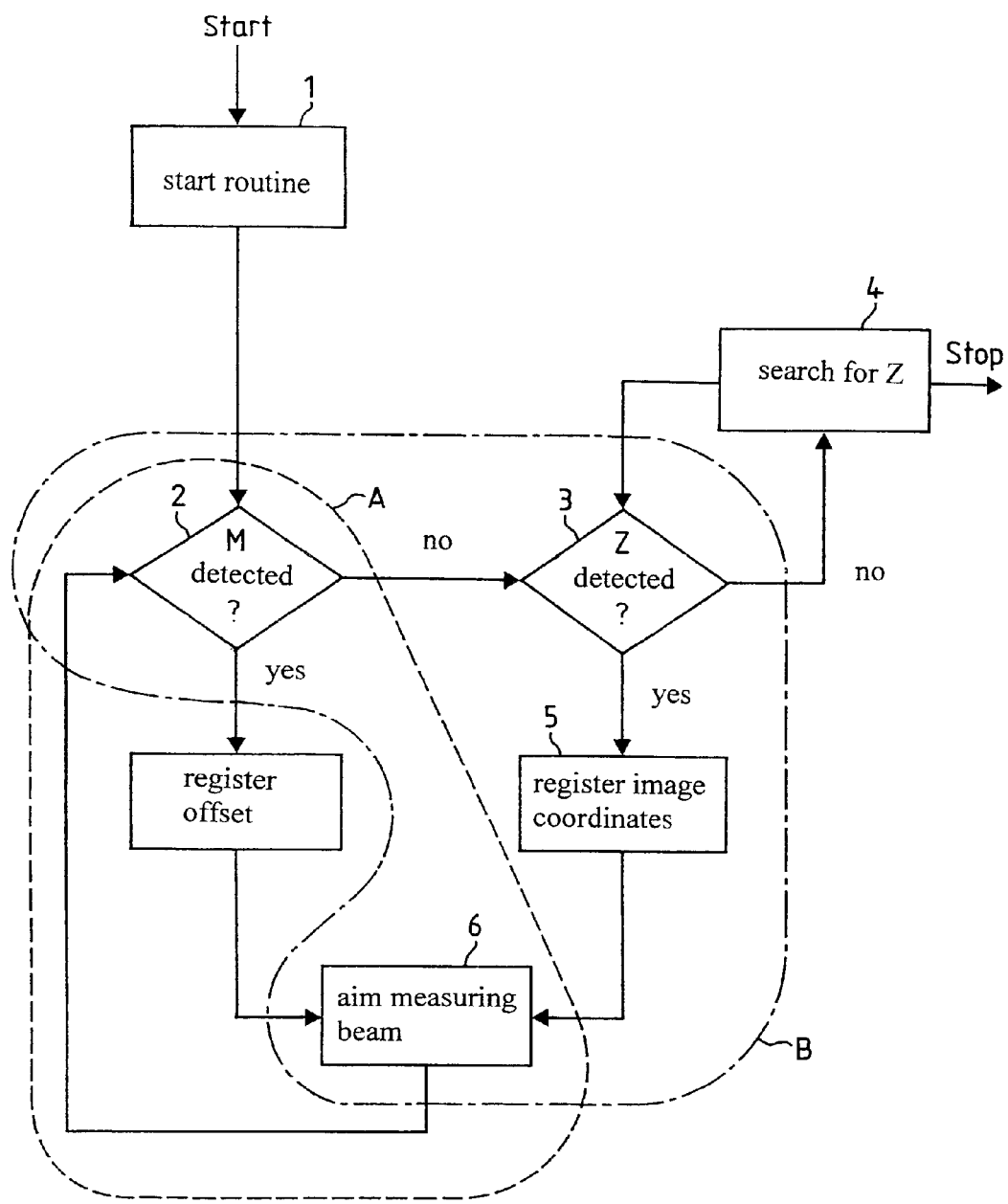
FIG. 1 is a simplified block diagram of an exemplary embodiment of the tracking method according to the invention.

FIG. 1 is a block diagram of an exemplary embodiment of the tracking method according to the invention, wherein only the most important steps of the method are represented and wherein the overview apparatus is an overview camera.

After starting the system and after carrying out a start routine 1, which is determined by the system, and in which the system parts are activated, the system checks as to whether the measurement beam of the laser tracker, which may have any direction at the moment of the system start, is aimed at the target point, which may be positioned anywhere, or not. In other words, the system checks as to whether the laser tracker detects the reflected measurement beam or not (decision 2 with regard to the detection of the reflected measurement beam). If there is no reflected beam detection, the target point is looked for on the image provided by the overview camera. If the target point is not found on the image of the overview camera (decision 3 with regard to the image of the target point), e.g. a search routine 4 is carried out. Such search routines are per se known. An exemplary search routine which may be applied in the measurement system according to the invention comprises changing the direction of the tracker or at least of the overview camera according to a predetermined pattern, and simultaneously and continuously checking as to whether or not the target point appears on the image of the overview camera (decision 3). If the search routine, for example, remains without success for a defined time or after the completion of a complete routine, then the system may stop, as the case may be, with a suitable communication to the operating person. As soon as the target point appears on the image provided by the overview camera, the measurement system switches into the extraordinary tracking mode. Therein, the image coordinates of the target point on the image of the overview camera are detected (image analysis 5). From the image coordinates and from the known position and orientation of the camera relative to the measurement beam, it is determined how the measurement beam direction is to be changed in order to aim the measurement beam onto the target point, which will usually not be possible in one go, if the target point is moving. For this reason, the measurement beam direction is changed 6 according to the data and then it is again checked as to whether the measurement beam is incident on the reflector or not, that is to say whether the reflected measurement beam is detected or not (decision 2). If this is not the case, the system remains in the extraordinary tracking mode, which means that measurement data for the control of further changes of the measurement beam direction continue to be deduced from further images obtained from the overview camera. As soon as the reflected measurement beam is detected, the system switches into the per se known, ordinary tracking mode. In this ordinary tracking mode, the measurement data for the control of the measurement beam direction are obtained, for example, from the evaluation of the parallel offset between the emitted and the reflected measurement beam. The corresponding measurement data are provided, for example, by a PSD, which is arranged in the beam path of a part of the reflected measurement beam. In this tracking mode, determination of the position of the target point is operable. The system switches back into the extraordinary tracking mode as soon as the reflected measurement beam is no longer detected by the tracker (decision 2).

In FIG. 1, the main steps of the ordinary tracking mode are framed with a dashed line designated with A, and the main steps of the extraordinary tracking mode with a dot-dashed line designated with B.

If the accuracy of the measurement beam alignment with the aid of data provided by the overview camera is not adequate for being able to aim the measurement beam exactly at the target point with an adequate reliability, or if very rapid movements of the target point are likely, it may be advantageous to carry out a so-called spiral search after each aiming of the measurement beam with the aid of the data provided by the overview camera and negative check regarding reflected beam detection. In such a spiral search routine, the measurement beam is moved in a spiral about an originally set direction.

It is advantageous to design the measurement system in a manner such that the operating or measuring person can at any time read the mode in which the system is presently operating.

Figure 2:
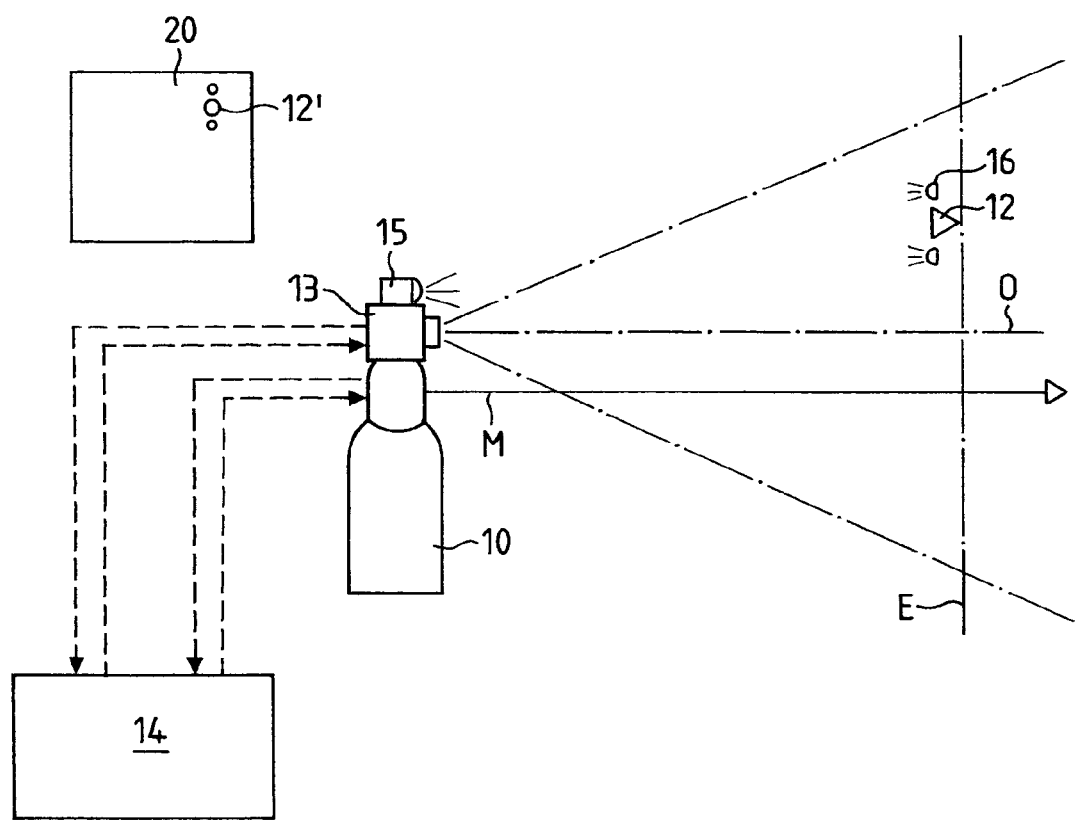
FIG. 2 is a schematic diagram of an exemplary embodiment of the measurement system with laser tracker according to the invention.

FIG. 2, in a very schematic manner, shows a measurement system with a laser tracker according to the invention. The laser tracker 10, in a per se known manner, emits a measurement beam M, whose direction is e.g. determined by the position of a mirror which is rotatable about two perpendicular axes. The measurement beam direction is detected in the form of a horizontal and a vertical angle relative to a zero direction with the aid of angle transmitters. The measurement beam further serves for the measurement of a distance between the tracker and the target point. The measurement system comprises in addition to the laser tracker 10 a target point being marked with a reflector 12, an overview apparatus 13, and a computation and control unit 14.

The overview apparatus 13 has an as wide as possible viewing angle which is represented with dot-dashed lines, and an optical axis O which is likewise represented with a dot-dashed line. The position and orientation of the overview apparatus relative to the measurement beam M must be known at all times by the system. In order for the overview apparatus 12 to detect the reflector 12 at the target point, the target point or reflector must be illuminated, or its position must be marked with detectable elements. An illumination of the reflector itself or of reflecting marking elements is realised with the help of an illumination means 15 in the region of the overview apparatus. For marking the reflector position however, one may also provide illumination means 16 in the region of the reflector 12. Reflecting marking means or illumination means 16 in the region of the reflector 12 are advantageously designed as an arrangement of a plurality of marking points, so that the target point, on account of the specific geometry of this arrangement, cannot only be registered, but also identified on the image of an overview camera functioning as an overview apparatus. If the reflector 12 has an exactly defined position in such an arrangement of marking points, e.g. constitutes its optical center of gravity, it is sufficient for the arrangement, but not the reflector itself, to be visible on the image recorded by the overview camera, or for it to be able to be registered by a PSD in the overview apparatus.

The measurement system represented in FIG. 2 is evidently in a condition in which the measurement beam M is not incident on the reflector 12, thus the laser tracker 10 cannot detect any reflected measurement beam. The reflector 12 however is located in the viewing field of the overview apparatus 13, so that tracking in the extraordinary tracking mode is possible. The image 20 registered at the represented moment by the overview camera 13 functioning as an overview apparatus, is imaged at the top left in FIG. 2. The reflector is visible on this image (image 12' and illumination means). The image coordinates of the reflector image 12' define a direction from the camera to the reflector relative to the optical axis O of the camera. From the image coordinates, it is possible to determine in which direction the measurement beam direction is to be changed in order for the measurement beam to get aimed at the reflector, if the position and alignment of the overview camera 13 or its optical axis O respectively, is known relative to the measurement beam direction.

If the optical axis O of the overview apparatus 12 is coincident with the measurement beam at all times or is aligned parallel to this at all times and the direction of the overview apparatus is therefore coupled to the direction of the measurement beam in a fixed manner, then the computation of the control data for changing the measurement beam direction is relatively simple. If the direction of the optical axis O of the overview apparatus 13 and of the measurement beam M are not coupled to one another, then the computation of the control data is more complicated and, as the case may be, is dependent also on the distance between the tracker 10 and the reflector 12, which in this case must likewise be known. This distance may be provided at least in an approximate manner, for example, by the optics of the overview apparatus 13, or may be taken to be the same as the last distance measured by the tracker.

Depending on the optical design of the overview apparatus, internal conditions of this apparatus are also to be included into the computation of the data necessary for the measurement beam control.

In a measuring system, in which the overview apparatus 13 is rotatable together with the measurement beam M about the vertical tracker axis (standing axis), but not about the horizontal tracker axis (tilt axis), the optical axis O of the overview apparatus 13 is at an angle with the measurement beam M, said angle being dependent on the momentary measurement beam direction. In the preferred embodiment of the measurement system according to the invention, the overview apparatus 13 or at least its optical axis O is coupled to the measurement beam direction by way of the overview apparatus being arranged, for example, on the part of the tracker 10 which controls the measurement beam direction by being rotatable about two axes, or by way of optics being arranged in front of the overview apparatus 13 and equipped for aligning the optical axis of the overview camera coaxially or parallel with the measurement beam.

As already indicated further above, it is advantageous to equip the reflector 12 in a manner such that its image 12' may be identified on the image 20 recorded by the overview camera 13. This is realised, for example, by way of arranging, for example, active light points 16 or reflecting marking points illuminated from the tracker, around the reflector 12. This arrangement appears on the image 20 of the overview camera 13, even if the reflector 12, as the case may be, is itself not imaged on account of lack of light from the camera which is incident thereon. If the reflector 12 is arranged in the optical center of gravity of the mentioned arrangement, its image coordinates may be determined in a simple way and manner from the image of the arrangement.

FIG. 2 also shows the computation and control unit 14 and data lines (shown dashed) which connect this unit to the overview apparatus 13 and the laser tracker 10, and by way of which the control and read-out commands are transferred from the computation and control unit to the tracker 10 and overview apparatus 13, and measurement data are transferred in the reverse direction. Of course, at least parts of the computation and control unit 14 may also be integrated in the tracker 10 and/or in the overview apparatus, and data may also be transferred in a wireless manner to and from the computation and control unit.

The invention claimed is:

1. A tracking method, in which a target point provided with a reflector is tracked by a measurement beam (M) of a laser tracker, comprising the steps of:
   in an ordinary tracking mode (A), data for controlling the direction of the measurement beam (M) is derived from the detection of the measurement beam being reflected by the reflector, and
   in an extraordinary tracking mode (B), the data for controlling the direction of the measurement beam (M) is derived from data being registered by an overview apparatus,
   wherein the overview apparatus has a known position and orientation relative to the measurement beam (M),
   wherein the extraordinary tracking mode (B) is active when no measurement beam reflected by the reflector is detected,
   wherein in the extraordinary tracking mode (B), the data for controlling the direction of the measurement beam (M) is computed from a direction to the target point being determined from data registered by the overview apparatus, and from the known position and orientation of the overview apparatus,
   wherein the overview apparatus is an overview camera, the data registered by the overview camera are image coordinates, and the target point is in addition identified by the overview camera, and
   wherein the target point is identified on images registered by the overview camera with the aid of a plurality of light points or reflected marking elements, which are arranged around the reflector and imaged by the overview camera.

2. The method according to claim 1, wherein the extraordinary tracking mode (B) is automatically activated as soon as no reflected measurement beam is detected by the tracker.

3. The method according to claim 1, wherein when the extraordinary tracking mode (B) is activated, the tracker monitors detection of the reflected measurement beam, and that the ordinary tracking mode (A) is automatically activated, as soon as the reflected measurement beam is detected.

4. The method according to claim 1, wherein the image coordinates are determined by way of determining the optical center of gravity of an image of the light points or the marking elements, which are arranged around the reflector.

5. The method according to claim 1, wherein the direction of an optical axis (O) of the overview apparatus is coupled to the direction of the measurement beam (M) in a fixed manner.

6. A measurement system comprising:
   a laser tracker,
   a target point with a reflector and
   a computation and control unit,
   in which measurement system a measurement beam (M) emitted by the laser tracker tracks the reflector in an ordinary tracking mode (A),
   wherein the computation and control unit is designed for controlling, in an ordinary tracking mode, the direction of the measurement beam (M) with the aid of detecting the measurement beam being reflected by the reflector,
   wherein the measurement system additionally comprises an overview apparatus which is arranged in a known position and orientation relative the measurement beam (M), and that the computation and control unit is in addition designed for controlling the direction of the measurement beam (M), in an extraordinary tracking mode (B), which is active when no measurement beam reflected by the reflector is detected, with the aid of data being generated by the overview apparatus, and with the aid of the known position and orientation of the overview apparatus,
   wherein the measurement system is configured to compute, in the extraordinary tracking mode, the data for controlling the direction of the measurement beam from a direction to the target point being determined from data registered by the overview apparatus, and from the known position and orientation of the overview apparatus,
   wherein the overview apparatus is an overview camera, the data registered by the overview camera are image coordinates, and the target point is in addition identified by the overview camera, and
   wherein the measurement system is configured to identify the target point on images registered by the overview camera with the aid of a plurality of light points or reflected marking elements, which are arranged around the reflector and imaged by the overview camera.

7. The measurement system according to claim 6, wherein the overview apparatus which is an overview camera, is an optical device comprising an optical axis arranged on the laser tracker in a manner such that a direction of the optic axis (O) of the overview apparatus is coupled to the direction of the measurement beam (M).

8. The measurement system according to claim 7, wherein the overview apparatus is arranged on the laser tracker in a manner such that its optical axis (O) always runs coaxially or parallel to the measurement beam (M).

9. The measurement system according to claim 6, wherein the target point is arranged on a hand-held touch tool or scanner.

10. The measurement system according to claim 6, wherein a plurality of light points or reflecting marking elements is arranged around the reflector arranged in the target point, and that the computation and control unit or the overview apparatus is designed to evaluate the direction to the reflector from an arrangement of light points or marking elements.

* * * * *